US009685702B2

(12) United States Patent
Hu et al.

(10) Patent No.: US 9,685,702 B2
(45) Date of Patent: Jun. 20, 2017

(54) BEAMFORMING METHOD, APPARATUS FOR POLARIZED ANTENNA ARRAY AND RADIO COMMUNICATION DEVICE AND SYSTEM THEREOF

(75) Inventors: Yang Hu, Beijing (CN); David Astely, Bromma (SE); Zhiheng Guo, Beijing (CN); Muhammad Imadur Rahman, Sollentuna (SE); Hai Wang, Beijing (CN); Ruiqi Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 820 days.

(21) Appl. No.: 13/991,990

(22) PCT Filed: Dec. 17, 2010

(86) PCT No.: PCT/CN2010/002075
§ 371 (c)(1),
(2), (4) Date: Jun. 6, 2013

(87) PCT Pub. No.: WO2012/079202
PCT Pub. Date: Jun. 21, 2012

(65) Prior Publication Data
US 2013/0257655 A1    Oct. 3, 2013

(51) Int. Cl.
*H01Q 3/00* (2006.01)
*G01S 3/16* (2006.01)
(Continued)

(52) U.S. Cl.
CPC .............. *H01Q 3/40* (2013.01); *H04B 7/0408* (2013.01); *H04B 7/0413* (2013.01);
(Continued)

(58) Field of Classification Search
CPC ........................... H01Q 3/2611; H01Q 25/002
(Continued)

(56) References Cited

U.S. PATENT DOCUMENTS 6,144,339 A    11/2000    Matsumoto et al.
6,331,837 B1    12/2001    Shattil
(Continued)

FOREIGN PATENT DOCUMENTS

CN    101316129 A    12/2008
CN    101316130 A    12/2008
(Continued)

OTHER PUBLICATIONS

Office Action dated Jun. 15, 2015, issued in Chinese Patent Application No. 201080070739.X, 9 pages.
(Continued)

*Primary Examiner* — Dao Phan
(74) *Attorney, Agent, or Firm* — Rothwell, Figg, Ernst & Manbeck, P.C.

(57) ABSTRACT

The invention discloses a beamforming method for polarized antenna array consisting of a plurality of antenna elements, applied to single layer beamforming or dual layer beamforming, which includes the steps: determining (201) first beamforming weights for phase compensation among the antenna elements within each polarization direction; determining (202) second beamforming weights for phase compensation between equivalent channels of two polarization directions; and calculating (203) hybrid beamforming weights as product of the first beamforming weights and the second beamforming weights. A beamforming apparatus for polarized antenna array is also provided in the invention as well as a radio communication device and a system thereof. With the invention, the single-layer and dual-layer beamforming weights are determined for the cross-polarized antenna array without requiring full channel knowledge or the aid of PMI. Computation complexity is lowered and full power amplifier utilization can be achieved.

32 Claims, 3 Drawing Sheets

(51) Int. Cl.
    *H01Q 3/40*     (2006.01)
    *H04B 7/0408*     (2017.01)
    *H04B 7/0413*     (2017.01)
    *H04B 7/06*     (2006.01)
    *H04B 7/10*     (2017.01)
    *H04B 7/04*     (2017.01)

(52) U.S. Cl.
    CPC ......... *H04B 7/0469* (2013.01); *H04B 7/0617* (2013.01); *H04B 7/0686* (2013.01); *H04B 7/0691* (2013.01); *H04B 7/10* (2013.01); *H04B 7/0671* (2013.01); *Y02B 60/50* (2013.01)

(58) Field of Classification Search
    USPC .......... 342/81, 157, 373, 377, 382; 455/132, 455/137
    See application file for complete search history.

(56) References Cited

U.S. PATENT DOCUMENTS 6,535,180 B1     3/2003     Gregorwich et al.
2004/0043795 A1     3/2004     Zancewicz et al.
2004/0121810 A1     6/2004     Goransson et al.
2006/0135097 A1*     6/2006     Wang et al. .................. 455/132
2008/0089432 A1     4/2008     Park et al.
2009/0323582 A1*     12/2009     Proctor et al. ................ 370/315

FOREIGN PATENT DOCUMENTS

CN     101459457 A     6/2009
EP     2246937 A1     11/2010
JP     2006229704 A     8/2006

OTHER PUBLICATIONS

3GPP, "Comparison between Long-term and Short-term Dual-Layer Beamforming", 3GPP TSG RAN WG1 58 R1-093166, Aug. 24-28, 2009, 11 pages.

Extended European Search Report dated Dec. 23, 2015, issued in European Patent Application No. 10860863.9, 6 pages.

Second Office Action dated Jan. 12, 2016, issued in Chinese Patent Application No. 201080070739.X, 8 pages.

* cited by examiner

BEAMFORMING METHOD, APPARATUS FOR POLARIZED ANTENNA ARRAY AND RADIO COMMUNICATION DEVICE AND SYSTEM THEREOF

CROSS-REFERENCE TO RELATED APPLICATION(S)

This application is a 35 U.S.C. §371 National Phase Entry Application from PCT/CN2010/002075, filed Dec. 17, 2010, designating the United States, the disclosure of which is incorporated herein in its entirety by reference.

TECHNICAL FIELD

The present invention relates to beamforming technologies in wireless communication systems, including but not limited to 3GPP LTE, TD-SCDMA, WCDMA, WiMAX, UMB and GSM systems, in particular to a beamforming method and apparatus for polarized antenna array in those systems.

BACKGROUND

Beamforming technology is adopted, for example, in 3GPP standard for TD-SCDMA and LTE. Beamforming is a combination of radio signals from a set of non-directional antennas (adaptive antenna array) to simulate a highly directional antenna. The simulated antenna can be pointed electronically, although the antenna does not physically move. In communications, beamforming is either used to point an antenna array at the signal source to reduce interference, or create the signals towards an intended user, thus improving communication quality. In practice in direction finding applications, beamforming can be used to steer an antenna to determine the direction of the signal source.

Linear antenna array is often used for beamforming, where the distance between the adjacent antenna elements in the antenna array is set to a length proportional to the wavelength of the carrier. For example, half of the wavelength of the carrier is fixed as the distance between two antenna elements in an antenna array. Such a close distance between antenna elements will lead to highly correlated spatial channel seen at the antennas. Grid of Beam (GoB) based beamforming is, for example, often employed as the preferred beamforming technique in this case, but in GoB algorithm, the weighting factor is pre-defined according to the position of the antenna elements due to the high correlation of the antennas.

To reduce the antenna size and facilitate spatial multiplexing, dual polarized antenna array is promoted in TD-SCDMA and TD-LTE deployment. As well known, the correlation between antenna elements of different polarization is very low, the pre-defined weighting vector for single polarized linear antenna array is not suitable for the dual-polarized antenna array. Thus, GoB as a beamforming method is not suitable for the dual-polarized antenna array, since high correlation between two polarization directions is typically not satisfied.

Eigen-based Beamforming (EBB) as another beamforming method is employed for the dual polarized antenna array, and EBB could be done based on infrequent or not overlapping Sounding Reference Signal (SRS) and Physical Uplink Shared Channel (PUSCH). But, the phase difference of the two polarization direction changes faster than the phase difference of the antenna elements within one polarization direction, so for EBB algorithm the phase difference of the two polarization directions should be measured and compensated more often based on SRS or PUSCH.

Furthermore, EBB implies optimal power allocation across antenna elements, which is not practical in the current enhanced NodeB (eNB) building practice where each antenna element has its own power amplifier and power sharing across antennas is not possible, thus, power efficiency could not be well utilized in EBB.

In an existing standard, as there is only one power amplifier in the UE side, UE transmits only on one antenna even if it has multiple receiver antennas. According to the channel reciprocity, only the beamforming weight for one layer corresponding to the 'active' antenna can be obtained. Antenna hopping could be enabled in terms of UE capability but which may increase implementation complexity or keep EBB algorithms not-scalable. So, in practice, a full 8×2 channel knowledge at the base station, required in the above EBB scheme, may not be implemented in all cases (here assume 8 antennas at eNB and 2 antennas at UE).

As dual layer beamforming is adopted to improve the throughput for the target. UE by transmitting two layers of beamformed signal. For dual layer beamforming, for example, PMI feedback from UE is used to aid beamforming vector generation in the eNB. But channel accuracy is degraded due to quantification loss. In addition, for fine precoding granularity, PMI may not be satisfied due to limited number of codebooks.

SUMMARY

To this end, the present invention proposes a hybrid scheme adopted for single-layer and dual-layer beamforming, without using EBB algorithm and without requiring full channel knowledge at the base station.

In one aspect of the invention, a beamforming method for polarized antenna array consisting of a plurality of antenna elements is proposed, which may be applied to single layer beamforming or dual layer beamforming. The method includes the following steps: determining first beamforming weights for phase compensation among the antenna elements within each polarization direction; determining second beamforming weights for phase compensation between equivalent channels of two polarization directions; and calculating hybrid beamforming weights as product of the first beamforming weights and the second beamforming weights.

In a second aspect of the invention, the beamforming apparatus for polarized antenna array consisting of a plurality of antenna elements is proposed, which is applied to single layer beamforming or dual layer beamforming. The apparatus includes, a first module, adapted to determine first beamforming weights for phase compensation among the antenna elements within each polarization direction; a second module, adapted to determine second beamforming weights for phase compensation between equivalent channels of two polarization directions; and a third module, adapted to calculate hybrid beamforming weights as product of the first beamforming weights and the second beamforming weights.

In a third aspect of the invention, a radio communication device with a polarized antenna array is proposed, which includes: beamforming weights applying means, adapted to apply hybrid beamforming weights calculated as product of first beamforming weights and second beamforming weights to the signals to be sent to at least a radio communication terminal and output the weighted signals, wherein the first beamforming weights is used for phase compensation among antenna elements within each polarization direction of a polarized antenna array, and the second beamforming weights is used for phase compensation between two polarization directions; and a transmitter, adapted to transmit the outputted signals weighted with the hybrid beamforming weights to the at least a radio communication terminal.

In a fourth aspect of the invention, a radio communication system is proposed, including: a plurality of radio communication terminals; and at least a radio communication device with a polarized antenna array, adapted to apply hybrid beamforming weights calculated as product of first beamforming weights and second beamforming weights to the signals to be transmitted to the plurality of radio communication terminals and output the weighted signals, wherein the first beamforming weights is used for phase compensation among antenna elements within each polarization direction of the polarized antenna array, and the second beamforming weights is used for phase compensation between two polarization directions.

In a preferred embodiment of the invention, when phase between the two polarization directions is hard to capture due to channel varying or mismatch of uplink SRS or PUSCH, a Cyclic Delay Diversity (CDD) like co-phasing could be employed to achieve frequency domain diversity instead. The weights can be performed in per subcarrier basis.

In a preferred embodiment of the invention, for dual layer beamforming, the beamforming weights within the polarization for the second layer is the same as that for the first layer. For the compensation phase between the two polarization directions, a $\pi$ phase difference is introduced between the two layers. Thereby the overall beamforming weights of two layers are orthogonal to each other.

According to the above solutions of the invention, following advantageous effects may be achieved.

The single-layer and dual-layer beamforming weights are determined for the cross-polarized antenna array without requiring full channel knowledge or the aid of PMI.

Computation complexity is not high as it does not require matrix decomposition as EBB scheme does.

Full Power Amplifier (PA) utilization may be achieved since the beamforming weight on each antenna is with unit power.

BRIEF DESCRIPTION OF THE DRAWINGS

The features and advantageous of the present invention will be more to apparent from the following exemplary embodiments of the invention illustrated with reference to the accompanied drawings, in which.

DETAILED DESCRIPTION

Embodiments of the present invention will be described more fully hereinafter with reference to the accompanied drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In this disclosure, although terminologies from 3GPP LTE and TD-SCDMA have been used to exemplify the invention, this should not be seen as limiting the scope of the invention to only the aforementioned system. Other wireless systems, including WCDMA, WiMAX, UMB and GSM, may also benefit from exploiting the ideas covered within this disclosure. Given the rapid development in communications, there will of course also be future type wireless communications systems with which the present invention may be embodied.

Also note that terminology such as base station and UE should be to considering non-limiting and does in particular not imply a certain hierarchical relation between the two; in general "base station" could be considered as communication device 1 and "UE" as communication device 2, and these two devices communicate with each other over some radio channel.

Figure 1:
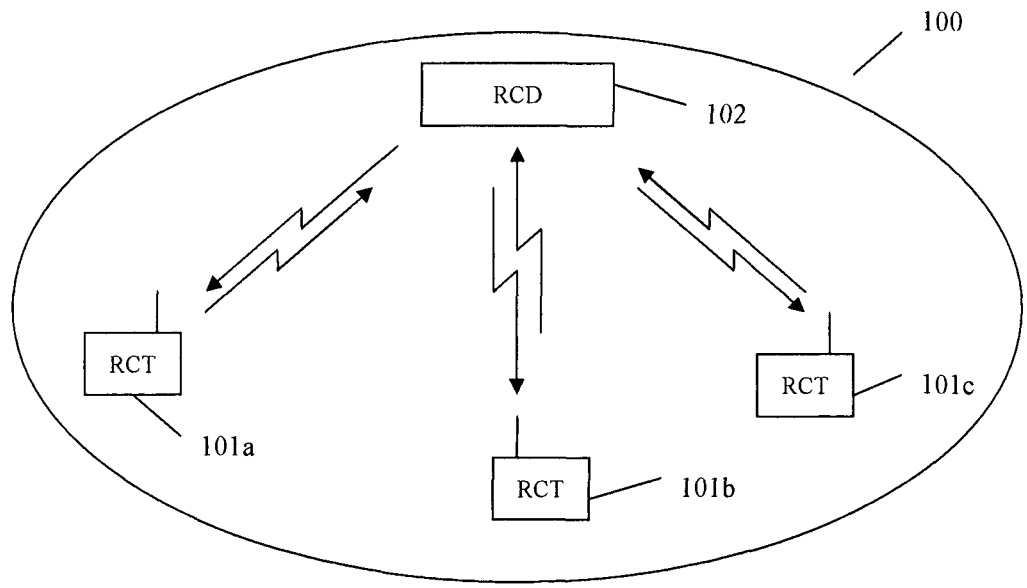
FIG. 1 illustrates a schematic diagram of a radio communication system according to an embodiment of the invention.

FIG. 1 illustrates a schematic diagram of a radio communication system 100 according to an embodiment of the invention. The radio communication system 100 may include a plurality of radio communication terminals 101a, 101b, 101c, and at least a radio communication device 102 communicated with the radio communication terminals 101a, 101b, 101c via radio channels. The radio communication device 102 may be equipped with a polarized antenna array with which communication signals are transmitted/received to the plurality of radio communication terminals 101a, 101b, 101c.

In an embodiment of the invention, the radio communication device 102 may apply hybrid beamforming weights calculated from, for example, weights for beamforming within polarization and weights for beamforming between polarizations to the signals to be transmitted to the plurality of radio communication terminals 101a, 101b, 101c, and output signals weighted with the hybrid beamforming weights. The weights for beamforming within polarization is used for phase compensation among antenna elements within each polarization direction of the polarized antenna array, and the weights for beamforming between polarizations is used to compensate the phase difference between the two polarization directions. As to be noted, the features applied to the following embodiments may also be applied in this system.

Figure 2:
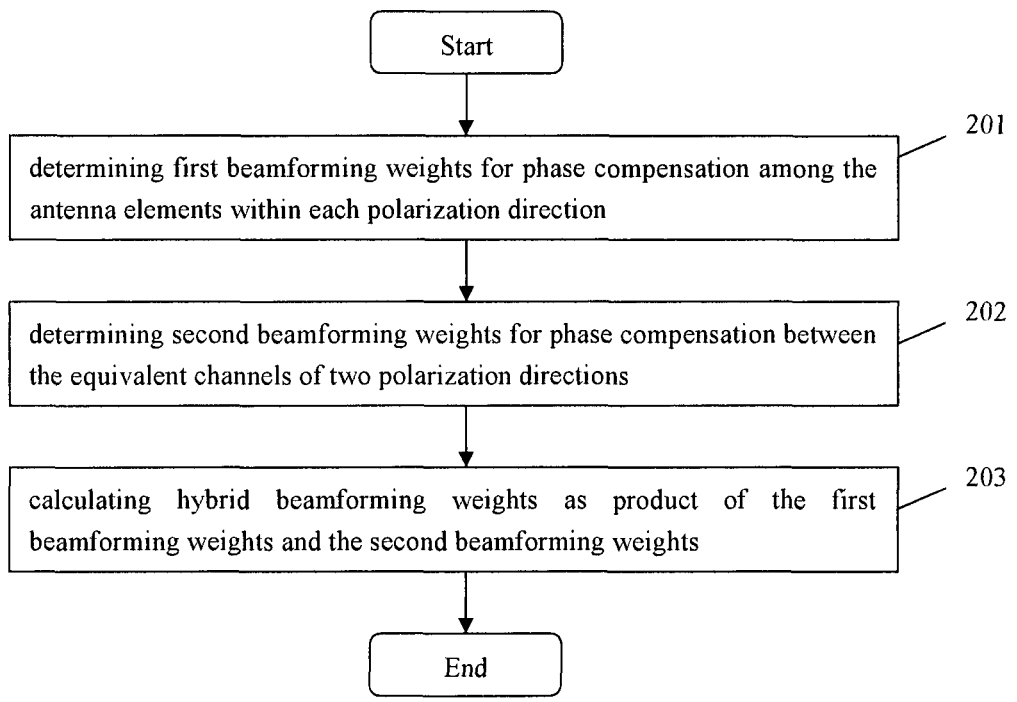
FIG. 2 illustrates a flowchart of a beamforming method for a polarized antenna array according to an embodiment of the invention.

FIG. 2 illustrates a flowchart of a beamforming method for a polarized antenna array according to an embodiment of the invention. In the embodiment of the invention, the beamforming method for a polarized antenna array includes the following steps.

At step 201, in antenna array of each polarization direction, the beamforming weights are determined to compensate the measured phase difference among the antenna elements within one polarization direction.

Preferably, the weights may be wideband. Since phase variation within polarization is relatively stable and slow, this may reduce complexity of computation and operation in the beamforming method.

Figure 3:
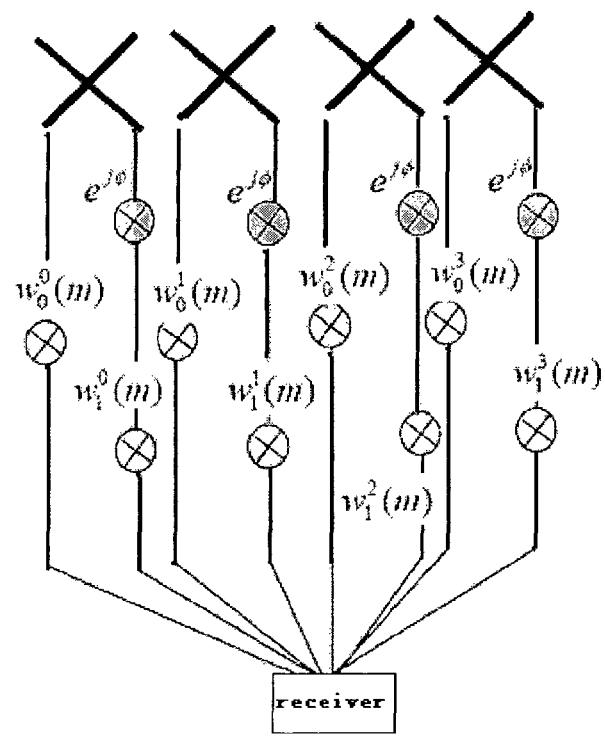
FIG. 3 illustrates an architecture with a beamforming method for polarized antenna array in a single-layer transmission according to an embodiment of the invention.

In the embodiment of the invention, weight vectors for each polarization direction are determined as follows. Refer to FIG. 3, which shows the architecture of the beamforming method for dual-polarized antenna array, illustrated for single-layer transmission.

As the dual-polarized antenna array structure shown in the above picture, assuming: in each polarization direction, there are A/2 antenna elements. The signal to antenna a in each polarization direction is weighted by a weighting factor $w_d^a$, where $a=0, 1, \ldots, A/2-1$ is the antenna index; A is the number of total transmitter antennas in the base station; d is the $1^{st}$ and $2^{nd}$ polarization direction; $H_{a,0}^k$, $H_{a,1}^k$ are the channel estimation from antenna a of $1^{st}$ and $2^{nd}$ polarized direction on k-th sub-carrier, and $w_0^a$, $w_1^a$ are the weighting factor for antenna a of $1^{st}$ and $2^{nd}$ polarization direction respectively, which may be obtained by the following three steps.

Step-1: Correlation Vector Calculation

For the first polarization direction, the formula (1) is calculated as:

$$V_0 = \begin{bmatrix} v_0^0 \\ v_0^1 \\ \vdots \\ v_0^{A/2-1} \end{bmatrix}, \text{ where } v_0^a = \sum_{k=0}^{N_{RB}^{UL} \times N_{sc}^{RB}-1} H_{0,0}^k \times (H_{a,0}^k)^* \quad (1)$$

For the second polarization direction, the formula (2) is calculated as:

$$V_1 = \begin{bmatrix} v_1^0 \\ v_1^1 \\ \vdots \\ v_1^{A/2-1} \end{bmatrix}, \text{ where } v_1^a = \sum_{k=0}^{N_{RB}^{UL} \times N_{sc}^{RB}-1} H_{0,1}^k \times (H_{a,1}^k)^* \quad (2)$$

Preferably, the correlation vector of two polarizations may be determined jointly as formula (3) below, since they describe the same angle-of-arrival information. This may achieve enhanced vector statistics, and improve precision of the relevant vectors.

$$V_0 = V_1 = \frac{1}{2} \begin{bmatrix} v_0^0 + v_1^0 \\ v_0^1 + v_1^1 \\ \vdots \\ v_0^{A/2-1} + v_1^{A/2-1} \end{bmatrix} \quad (3)$$

Step-2: Time Domain Filtering of the Correlation Vector

To overcome the interference, the correlation vector is filtered by a forgetting factor if continuous uplink channel coefficients can be obtained in time domain, as shown in formulas (4) and (5):

$$\overline{V}_0^t = \alpha \times \overline{V}_0^{t-1} + (1-\alpha) \times V_0^t \quad (4)$$

$$\overline{V}_1^t = \alpha \times \overline{V}_1^{t-1} + (1-\alpha) \times V_1^t \quad (5)$$

Where $0 \leq \alpha \leq 1$ is the forgetting factor. $\overline{V}_0^{t-1}$ and $\overline{V}_1^{t-1}$ are the filtered correlation vector obtained at the last subframe, i.e. (t−1)th subframe.

Step-3: Beamforming Vector for Each Polarization Direction

We can determine the resulting weight vectors for two different polarization directions as the formulas (6) and (7) shown below:

$$W_0 = \begin{bmatrix} w_0^0 \\ w_0^1 \\ \vdots \\ w_0^{A/2-1} \end{bmatrix}, \text{ where } w_0^a = \frac{\overline{v}_0^a}{|\overline{v}_0^a|} \quad (6)$$

$$W_1 = \begin{bmatrix} w_1^0 \\ w_1^1 \\ \vdots \\ w_1^{A/2-1} \end{bmatrix}, \text{ where } w_1^a = \frac{\overline{v}_1^a}{|\overline{v}_1^a|} \quad (7)$$

According to the embodiment of the invention, $w_0^a$ and $w_1^a$ are with unit power, furthermore $w_0^0 = w_1^0 = 1$. Thus, in this way, an optimized and maximized utilization of power efficiency per transmit antenna is achieved according to the embodiment of the invention.

To maximize the SNR on the receiver, the phase difference between to two polarization directions should be estimated and compensated accordingly in the following step.

At step 202, weights for beamforming between two polarization directions are determined to compensate the phase difference between equivalent channels of the two polarization directions.

Preferably, the weights may either be narrowband, or wideband. This may also reduce complexity of computation and operation in the beamforming method since phase variation between two polarizations is relatively quick.

More preferably, due to the low correlation between two polarization directions, the compensated phase had better be sub-band based. This may achieve better phase compensation with an optimized polarization matching.

The polarization matching procedure may include the following steps.

Step-1: Equivalent Channel Calculation

An equivalent channel is calculated for each polarization direction. The equivalent channel of one polarization direction is formed by summing up the channel of each antenna weighted by the weighting factor of above step within the polarization direction.

$H_{a,0}^m = [H_{a,0}^{c_m}, H_{a,0}^{c_m+1}, \ldots, H_{a,0}^{c_m+L_m-1}]$ and $H_{a,1}^m = [H_{a,1}^{c_m}, H_{a,1}^{c_m+1}, \ldots, H_{a,1}^{c_m+L_m-1}]$ are the channel estimation vectors of m-th sub-band for antenna a of $1^{st}$ polarization direction and $2^{nd}$ polarization direction respectively. Moreover, $c_m$ and $L_m$ are the starting sub-carrier index and number of sub-carriers in sub-band m, respectively.

The equivalent channel for each polarization direction is calculated as following formulas (8) and (9):

$$H_0^m = W_0^T \begin{bmatrix} H_{0,0}^m \\ H_{1,0}^m \\ \vdots \\ H_{A/2-1,0}^m \end{bmatrix}, H_1^m = W_1^T \begin{bmatrix} H_{0,1}^m \\ H_{1,1}^m \\ \vdots \\ H_{A/2-1,1}^m \end{bmatrix} \quad (8) \text{ and } (9)$$

Step-2: Correlation Vector and its Filtering

The correlation vector of the two polarized directions for sub-band m is estimated as formula (10):

$$R^m = \begin{bmatrix} r_0^m \\ r_1^m \end{bmatrix} = \begin{bmatrix} H_0^m (H_0^m)^H \\ H_0^m (H_1^m)^H \end{bmatrix} \quad (10)$$

Preferably, to increase robustness, the correlation vector is filtered by a forgetting factor if continuous uplink channel coefficients can be obtained as following formula (11):

$$\overline{R}_t^m = \beta \times \overline{R}_{t-1}^m + (1-\beta) \times \overline{R}_t^m \quad (11)$$

Where $0 \leq \beta \leq 1$ is the forgetting factor. $\overline{R}_{t-1}^m$ is the filtered correlation vector gotten by last subframe, i.e. (t−1)th subframe.

Step-3: Polarization Matching

The weighting factor for phase compensation across two polarizations is obtained by following formula (12):

$$P = \begin{bmatrix} p_0^m \\ p_1^m \end{bmatrix}, \text{ where } p_d^m = \frac{\overline{r}_d^m}{|\overline{r}_d^m|} \quad (12)$$

According to the embodiment of the invention, $p_d^m$ is with unit power, furthermore $p_0^m = 1$ and $p_1^m = e^{j\Phi_m}$. Thus, in this way, an optimized and maximized utilization of power efficiency is achieved according to the embodiment of the invention.

The above phase compensation calculation requires updated SRS or PUSCH or any other UL signals in general. If there is no updated SRS or PUSCH, a CDD like co-phasing may be employed to achieve frequency domain diversity instead, and the sub-band granularity may become per sub-carrier granularity, as shown in formula (13) here:

$$p_1^m = e^{-j \cdot 2\pi \cdot m \cdot \frac{\tau}{N}} \quad (13)$$

where $\tau$ is the artificial delay in samples for a size-N FFT as an example.

At step 203, ultimate hybrid beamforming weights are calculated as product of weights for beamforming within polarization and weights for beamforming between polarizations.

With the determined weighting vector for each polarization directions and phase compensation between polarizations, the ultimate beamforming weights on all antenna elements for the m-th sub-band can, be calculated as following formula (14):

$$W^m = \begin{bmatrix} p_0^m \begin{bmatrix} w_0^0 \\ w_0^1 \\ \vdots \\ w_0^{A/2-1} \end{bmatrix} \\ p_1^m \begin{bmatrix} w_1^0 \\ w_1^1 \\ \vdots \\ w_1^{A/2-1} \end{bmatrix} \end{bmatrix} = \begin{bmatrix} p_0^m \cdot w_0^0 \\ p_0^m \cdot w_0^1 \\ \vdots \\ p_0^m \cdot w_0^{A/2-1} \\ p_1^m \cdot w_1^0 \\ p_1^m \cdot w_1^1 \\ \vdots \\ p_1^m \cdot w_1^{A/2-1} \end{bmatrix} \quad (14)$$

Given the assumption that only one antenna at the UE side transmits signal even in the case of dual-layer beamforming (i.e. full channel knowledge not available at the base station), the base station estimates uplink channel and generates the beamforming weights for layer one in the same way as that in the case of single-layer beamforming. For the second layer, the beamforming weights within polarization direction are the same as that for the first layer, while the weights for phase compensation between polarizations are orthogonal to that adopted for the first layer to maximize the isolation between the two layers.

In a preferred embodiment of the invention, a coefficient of $$W_{L0}^m = \frac{1}{\sqrt{2}} \begin{bmatrix} p_0^m \begin{bmatrix} w_0^0 \\ w_0^1 \\ \vdots \\ w_0^{A/2-1} \end{bmatrix} \\ p_1^m \begin{bmatrix} w_0^0 \\ w_0^1 \\ \vdots \\ w_0^{A/2-1} \end{bmatrix} \end{bmatrix} = \frac{1}{\sqrt{2}} \begin{bmatrix} p_0^m \cdot w_0^0 \\ p_0^m \cdot w_0^1 \\ \vdots \\ p_0^m \cdot w_0^{A/2-1} \\ p_1^m \cdot w_0^0 \\ p_1^m \cdot w_0^1 \\ \vdots \\ p_1^m \cdot w_0^{A/2-1} \end{bmatrix} \quad (15)$$

$$W_{L1}^m = \frac{1}{\sqrt{2}} \begin{bmatrix} p_0^m \begin{bmatrix} w_0^0 \\ w_0^1 \\ \vdots \\ w_0^{A/2-1} \end{bmatrix} \\ -p_1^m \begin{bmatrix} w_1^0 \\ w_0^1 \\ \vdots \\ w_1^{A/2-1} \end{bmatrix} \end{bmatrix} = \frac{1}{\sqrt{2}} \begin{bmatrix} p_0^m \cdot w_0^0 \\ p_0^m \cdot w_0^1 \\ \vdots \\ p_0^m \cdot w_0^{A/2-1} \\ -p_1^m \cdot w_1^0 \\ -p_1^m \cdot w_1^1 \\ \vdots \\ -p_1^m \cdot w_1^{A/2-1} \end{bmatrix} \quad (16)$$

is further multiplied to split power equally between two layers on each antenna. The ultimate beamforming weights on all antenna elements for the $1^{st}$ and $2^{nd}$ layers are shown as formulas (15) and (16) below:

$$W_{L0}^m = \frac{1}{\sqrt{2}} \begin{bmatrix} p_0^m \begin{bmatrix} w_0^0 \\ w_0^1 \\ \vdots \\ w_0^{A/2-1} \end{bmatrix} \\ p_1^m \begin{bmatrix} w_1^0 \\ w_0^1 \\ \vdots \\ w_1^{A/2-1} \end{bmatrix} \end{bmatrix} = \frac{1}{\sqrt{2}} \begin{bmatrix} p_0^m \cdot w_0^0 \\ p_0^m \cdot w_0^1 \\ \vdots \\ p_0^m \cdot w_0^{A/2-1} \\ p_1^m \cdot w_1^0 \\ p_1^m \cdot w_1^1 \\ \vdots \\ p_1^m \cdot w_1^{A/2-1} \end{bmatrix} \quad (15)$$

$$W_{L1}^m = \frac{1}{\sqrt{2}} \begin{bmatrix} p_0^m \begin{bmatrix} w_0^0 \\ w_0^1 \\ \vdots \\ w_0^{A/2-1} \end{bmatrix} \\ -p_1^m \begin{bmatrix} w_1^0 \\ w_0^1 \\ \vdots \\ w_1^{A/2-1} \end{bmatrix} \end{bmatrix} = \frac{1}{\sqrt{2}} \begin{bmatrix} p_0^m \cdot w_0^0 \\ p_0^m \cdot w_0^1 \\ \vdots \\ p_0^m \cdot w_0^{A/2-1} \\ -p_1^m \cdot w_1^0 \\ -p_1^m \cdot w_1^1 \\ \vdots \\ -p_1^m \cdot w_1^{A/2-1} \end{bmatrix} \quad (16)$$

The features in this embodiment may not be limited to the only one embodiment, but applied to other embodiments in the invention.

Figure 4:
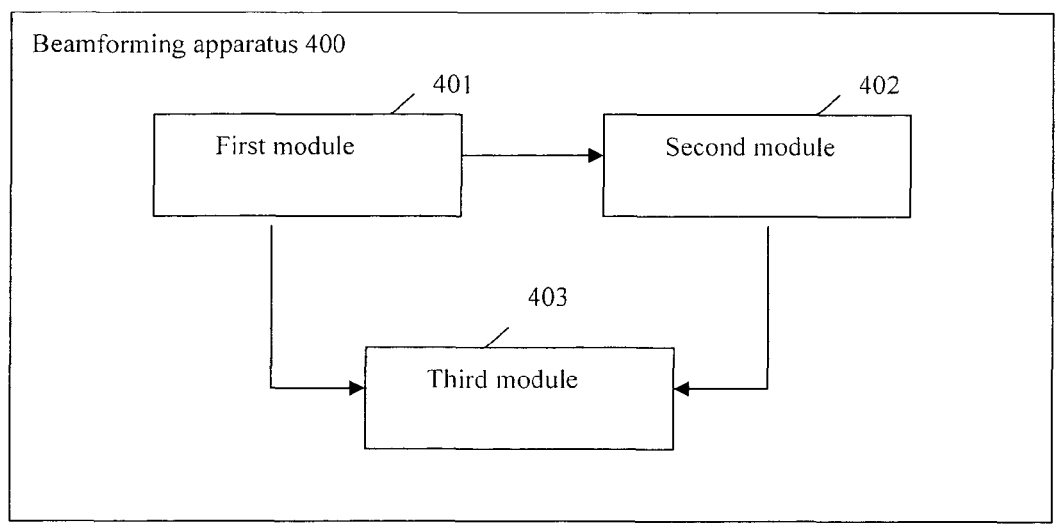
FIG. 4 illustrates a schematic diagram of a beamforming apparatus for a polarized antenna array according to an embodiment of the invention.

FIG. 4 illustrates a schematic diagram of a beamforming apparatus for a polarized antenna array according to an embodiment of the invention. The beamforming apparatus 400 for polarized antenna array consisting of a plurality of antenna elements may be applied to single layer beamforming or dual layer beamforming.

The apparatus 400 may include a first module 401, adapted to determine beamforming weights to compensate the measured phase difference among the antenna elements within one polarization direction; preferably, the weights may be wideband; and a second module 402, adapted to determine beamforming weights between two polarization directions to compensate the phase difference between equivalent channels of the two polarization directions; preferably, the weights may either be narrowband or wideband; and a third module 403, adapted to calculate hybrid beamforming weights as product of the weights for beamforming within polarization and the weights for phase compensation between polarizations.

Preferably, equivalent channels for each polarization direction are calculated by summing up channels of the antenna elements weighted by the beamforming weights within each polarization direction.

Figure 5:
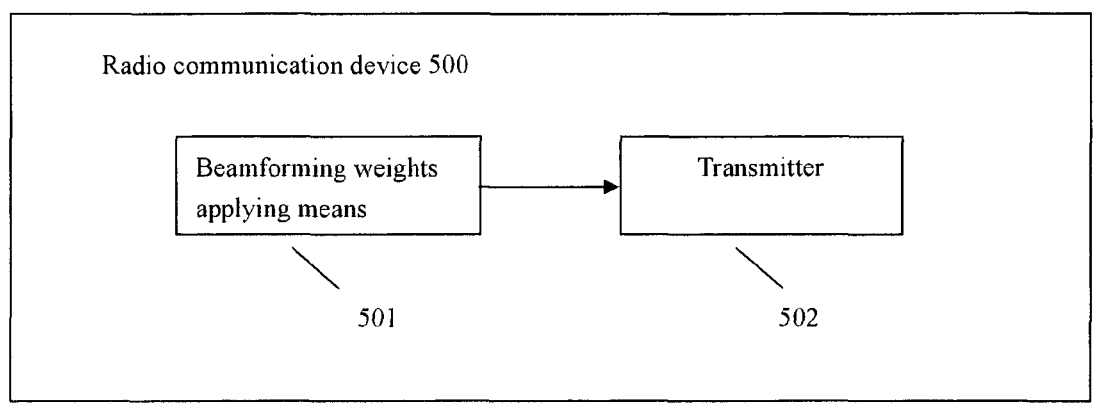
FIG. 5 illustrates a schematic diagram of a radio communication device according to an embodiment of the invention.

FIG. 5 illustrates a schematic diagram of a radio communication device according to an embodiment of the invention. The radio is communication device 102, 500 may be equipped with a polarized antenna array, which may communicate with at least one radio communication terminal via radio channels.

In particular, the device 102, 500 may include: beamforming weights applying means 501, adapted to apply hybrid beamforming weights calculated as product of first beamforming weights and second beamforming weights to the signals to be sent to at least a radio communication terminal 101*a*, 101*b*, 101*c* and output the weighted signals, wherein the first beamforming weights is used for phase compensation among antenna elements within each polarization direction of a polarized antenna array, and the second beamforming weights is used for compensating the phase difference between equivalent channels of the two polarization directions; and a transmitter 502, adapted to transmit the outputted signals weighted with the hybrid beamforming weights to the at least a radio communication terminal 101*a*, 101*b*, 101*c*.

Preferably, equivalent channels for each polarization direction are calculated by summing up channels of the antenna elements weighted by the beamforming weights within each polarization direction.

The unit(s) or module(s) comprised in the device/apparatus according to some embodiments may be any unit normally used for performing the involved tasks, e.g., a hardware, such as a processor with a memory.

The invention may be implemented in any suitable form including hardware, software, firmware or any combination thereof. Specifically, the invention may be implemented as computer software running on one or more data processors and/or digital signal processors. The elements and components of an embodiment of the invention may be physically, functionally and logically implemented in any suitable way. Indeed, the to functionality may be implemented in a single unit, in a plurality of units or as part of other functional units. As such, the invention may be implemented in a single unit, or may be physically and functionally distributed between different units and processors.

The terminology used herein is for the purpose of describing particular embodiments only and is not intended to limit to the invention. As used herein, the singular forms "a", "an" and "the" are intended to include the plural forms as well, unless otherwise stated. It will be further understood that the terms "comprising", "including" and conjugation thereof when used herein, specify the presence of stated features, integers, steps, operations, elements, and/or components, but do not preclude the presence or addition of one or more other features, integers, steps, operations, elements, components, and/or groups thereof.

Although the present invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A beamforming method for a polarized antenna array comprising a plurality of antenna elements, applied to single layer beamforming or dual layer beamforming, the method comprising:

determining, by a base station, first beamforming weights for phase compensation among the antenna elements within each polarization direction;

determining, by the base station, second beamforming weights for phase compensation between equivalent channels of two polarization directions; and calculating, by the base station, hybrid beamforming weights as a product of the first beamforming weights and the second beamforming weights.

2. The method according to claim 1, wherein the step of determining first beamforming weights further comprises correlation vector calculation for each polarization direction.

3. The method according to claim 2, wherein the correlation vector of two polarization directions is determined jointly.

4. The method according to claim 2, wherein the correlation vector is filtered by a forgetting factor if continuous uplink channel coefficients are obtained in a time domain.

5. The method according to claim 1, wherein the first beamforming weight for two different polarization directions is calculated as:

$$W_0 = \begin{bmatrix} w_0^0 \\ w_0^1 \\ \vdots \\ w_0^{A/2-1} \end{bmatrix}, \text{ where } w_0^a = \frac{\bar{v}_0^a}{|\bar{v}_0^a|}$$

$$W_1 = \begin{bmatrix} w_1^0 \\ w_1^1 \\ \vdots \\ w_1^{A/2-1} \end{bmatrix}, \text{ where } w_1^a = \frac{\bar{v}_1^a}{|\bar{v}_1^a|}$$

and wherein, $w_0^a$ and $w_1^a$ are with unit power, where a=0, 1, . . . , A/2−1 is an antenna index per polarization direction, A is the number of total antenna elements in the antenna array, and $w_0^a$, $w_1^a$ are weighting factors for antenna element 'a' of $1^{st}$ and $2^{nd}$ polarized direction respectively.

6. The method according to claim 1, wherein the phase compensation between the equivalent channels of two polarization directions is sub-band based.

7. A beamforming method according to claim 1, wherein the step of determining second beamforming weights further comprises, calculating equivalent channels $H_0^m, H_1^m$ for each polarization direction by summing up channels of the antenna elements weighted by the beamforming weights within each polarization direction, as:

$$H_0^m = W_0^T \begin{bmatrix} H_{0,0}^m \\ H_{1,0}^m \\ \vdots \\ H_{A/2-1,0}^m \end{bmatrix}, H_1^m = W_1^T \begin{bmatrix} H_{0,1}^m \\ H_{1,1}^m \\ \vdots \\ H_{A/2-1,1}^m \end{bmatrix}$$

and wherein, $H_{a,0}^m = [H_{a,0}^{c_m}, H_{a,0}^{c_m+1}, \ldots, H_{a,0}^{c_m+L_m-1}]$ and $H_{a,1}^m = [H_{a,1}^{c_m}, H_{a,1}^{c_m+1}, \ldots, H_{a,1}^{c_m+L_m-1}]$ are the channel estimation vectors of m-th sub-band for antenna a of $1^{st}$ polarization direction and $2^{nd}$ polarization direction respectively; $c_m$ and $L_m$ are the starting sub-carrier index and number of sub-carriers in sub-band m, respectively.

8. The method according to claim 7, wherein the step of determining second beamforming weights further comprises calculating a correlation vector, $R^m$, of the two polarization directions for a sub-band m as:

$$R^m = \begin{bmatrix} r_0^m \\ r_1^m \end{bmatrix} = \begin{bmatrix} H_0^m (H_0^m)^H \\ H_0^m (H_1^m)^H \end{bmatrix}$$

wherein, $r_0^m, r_1^m$ are respectively the correlation coefficients of the first polarization direction and the correlation vector of the second polarization direction.

9. The method according to claim 8, wherein the correlation vector of the two polarization directions for a sub-band is filtered by a forgetting factor if continuous uplink channel coefficients are obtained.

10. The method according to claim 8, further comprising obtaining a weighting factor P, for phase compensation across two polarization directions for the m-th sub-band as:

$$P = \begin{bmatrix} p_0^m \\ p_1^m \end{bmatrix}, \text{ where } p_d^m = \frac{\bar{r}_d^m}{|\bar{r}_d^m|}$$

and wherein, $p_0^m, p_1^m$ represent the weighting factor for phase compensation respectively in the first polarization direction and the second polarization direction, and $p_d^m$ is with unit power, furthermore $p_0^m = 1$ and $p_1^m = e^{j\Phi_m}$.

11. The method according to claim 10, wherein the phase compensation calculation is based on updated Sounding Reference Signal, SRS, or Physical Uplink Shared Channel, PUSCH.

12. The method according to claim 11, wherein a CDD like co-phasing is employed to obtain frequency domain diversity if there is no updated SRS or PUSCH, and sub-band granularity becomes per sub-carrier granularity as:

$$p_1^m = e^{-j \cdot 2\pi \cdot m \cdot \frac{\tau}{N}}$$

where τ is the artificial delay in samples for a size-N FFT.

13. The method according to claim 1, wherein the method is applied to dual layer beamforming, and the first beamforming weights within each polarization direction for the second layer are the same as for the first layer.

14. The method according to claim 13, wherein, for the compensation phase between the two polarization directions, a π phase difference is introduced between the two layers to allow overall beamforming weights of the two layers to be orthogonal to each other.

15. The method according to claim 14, wherein a coefficient of $$\frac{1}{\sqrt{2}}$$

is further multiplied with the hybrid beamforming weights to split power equally between two layers on each antenna element.

16. A beamforming apparatus for a polarized antenna array comprising a plurality of antenna elements, wherein the beamforming apparatus is a base station, applied to single layer beamforming or dual layer beamforming, the apparatus comprising:
a first module, adapted to determine first beamforming weights for phase compensation among the antenna elements within each polarization direction;
a second module, adapted to determine second beamforming weights for phase compensation between equivalent channels of two polarization directions; and
a third module, adapted to calculate hybrid beamforming weights as a product of the first beamforming weights and the second beamforming weights.

17. The beamforming apparatus according to claim 16, wherein the first module is further adapted to calculate a correlation vector for each polarization direction.

18. The beamforming apparatus according to claim 17, wherein the correlation vector of two polarization directions is determined jointly.

19. The beamforming apparatus according to claim 17, wherein the correlation vector is filtered by a forgetting factor if continuous uplink channel coefficients are obtained in a time domain.

20. The beamforming apparatus according to claim 16, wherein the first beamforming weight for two different polarization directions is calculated as:

$$W_0 = \begin{bmatrix} w_0^0 \\ w_0^1 \\ \vdots \\ w_0^{A/2-1} \end{bmatrix}, \text{ where } w_0^a = \frac{\bar{v}_0^a}{|\bar{v}_0^a|}$$

$$W_1 = \begin{bmatrix} w_1^0 \\ w_1^1 \\ \vdots \\ w_1^{A/2-1} \end{bmatrix}, \text{ where } w_1^a = \frac{\bar{v}_1^a}{|\bar{v}_1^a|}$$

and wherein, $w_0^a$ and $w_1^a$ are with unit power, where $a = 0, 1, \ldots, A/2-1$ is an antenna index per polarization direction, A is the number of total antenna elements in the antenna array, and $w_0^a, w_1^a$ are weighting factors for antenna element 'a' of $1^{st}$ and $2^{nd}$ polarized direction respectively.

21. The beamforming apparatus according to claim 16, wherein the phase compensation between the equivalent channels of two polarization directions is sub-band based.

22. The beamforming apparatus according to claim 16, wherein, the second module is further adapted to calculate equivalent channels, $H_0^m, H_1^m$, for each polarization direction by summing up channels of the antenna elements weighted by the beamforming weights within each polarization direction, as:

$$H_0^m = W_0^T \begin{bmatrix} H_{0,0}^m \\ H_{1,0}^m \\ \vdots \\ H_{A/2-1,0}^m \end{bmatrix}, H_1^m = W_1^T \begin{bmatrix} H_{0,1}^m \\ H_{1,1}^m \\ \vdots \\ H_{A/2-1,1}^m \end{bmatrix}$$

and wherein, $H_{a,0}^m = [H_{a,0}^{c_m}, H_{a,0}^{c_m+1}, \ldots, H_{a,0}^{c_m+L_m-1}]$ and $H_{a,1}^m = [H_{a,1}^{c_m}, H_{a,1}^{c_m+1}, \ldots, H_{a,1}^{c_m+L_m-1}]$ are the channel estimation vectors of m-th sub-band for antenna a of $1^{st}$ polarization direction and $2^{nd}$ polarization direction respectively; and $c_m$ and $L_m$ are the starting sub-carrier index and number of sub-carriers in sub-band m, respectively.

23. The beamforming apparatus according to claim 22, wherein the second module is further adapted to calculate a correlation vector, $R^m$, of the two polarization directions for a sub-band m as:

$$R^m = \begin{bmatrix} r_0^m \\ r_1^m \end{bmatrix} = \begin{bmatrix} H_0^m (H_0^m)^H \\ H_0^m (H_1^m)^H \end{bmatrix}$$

wherein, $r_0^m, r_1^m$ are respectively the correlation coefficients of the first polarization direction and the correlation vector of the second polarization direction.

24. The beamforming apparatus according to claim 23, wherein the correlation vector of the two polarization directions for a sub-band is filtered by a forgetting factor if continuous uplink channel coefficients are obtained.

25. The beamforming apparatus according to claim 23, wherein the second module is further adapted to obtain a weighting factor, P, for phase compensation across two polarization directions for the m-th sub-band as:

$$P = \begin{bmatrix} p_0^m \\ p_1^m \end{bmatrix}, \text{ where } p_d^m = \frac{\bar{r}_d^m}{|\bar{r}_d^m|}$$

and wherein, $p_0^m, p_1^m$ represent the weighting factor for phase compensation respectively in the first polarization direction and the second polarization direction, and $p_d^m$ is with unit power, furthermore $p_0^m = 1$ and $p_1^m = e^{j\Phi_m}$.

26. The beamforming apparatus according to claim 25, wherein the phase compensation calculation is based on updated Sounding Reference Signal, SRS, or Physical Uplink Shared Channel, PUSCH.

27. The beamforming apparatus according to claim 25, wherein a CDD like co-phasing is employed to obtain frequency domain diversity if there is no updated SRS or PUSCH, and sub-band granularity becomes per sub-carrier granularity as:

$$p_1^m = e^{-j \cdot 2\pi \cdot m \cdot \frac{\tau}{N}}$$

where $\tau$ is the artificial delay in samples for a size-N FFT.

28. The beamforming apparatus according to claim 16, wherein the apparatus is applied to dual layer beamforming, and the first beamforming weights within each polarization direction for the second layer are the same as for the first layer.

29. The beamforming apparatus according to claim 28, wherein, for the compensation phase between the two polarization directions, a $\pi$ phase difference is introduced between the two layers to allow overall beamforming weights of the two layers to be orthogonal to each other.

30. The beamforming apparatus according to claim 29, wherein a coefficient of $$\frac{1}{\sqrt{2}}$$

is further multiplied with the hybrid beamforming weights to split power equally between two layers on each antenna element.

31. A radio communication device with a polarized antenna array, comprising:
beamforming weights applying modules, adapted to apply hybrid beamforming weights calculated as a product of first beamforming weights and second beamforming weights to the signals to be sent to at least a radio communication terminal and to output the weighted signals, wherein the first beamforming weights are used for phase compensation among antenna elements within each polarization direction of a polarized antenna array, and the second beamforming weights are used for phase compensation between two polarization directions; and
a transmitter, adapted to transmit the outputted signals weighted with the hybrid beamforming weights to the at least a radio communication terminal.

32. A radio communication system, comprising:
a plurality of radio communication terminals; and
at least a radio communication device with a polarized antenna array, adapted to apply hybrid beamforming weights calculated as a product of first beamforming weights and second beamforming weights to the signals to be transmitted to the plurality of radio communication terminals and to output the weighted signals, wherein the first beamforming weights are used for phase compensation among antenna elements within each polarization direction of the polarized antenna array, and the second beamforming weights are used for phase compensation between two polarization directions.

* * * * *